(12) United States Patent
Lin

(10) Patent No.: US 9,118,257 B2
(45) Date of Patent: Aug. 25, 2015

(54) LLC SINGLE STAGE POWER FACTOR CORRECTION CONVERTER

(71) Applicant: Fuxiang Lin, Lidcombe (AU)

(72) Inventor: Fuxiang Lin, Lidcombe (AU)

( * ) Notice: Subject to any disclaimer, the term of this patent is extended or adjusted under 35 U.S.C. 154(b) by 101 days.

(21) Appl. No.: 14/033,535

(22) Filed: Sep. 23, 2013

(65) Prior Publication Data

US 2015/0085535 A1    Mar. 26, 2015

(51) Int. Cl.
*H02M 1/42*    (2007.01)
*H02M 3/335*    (2006.01)

(52) U.S. Cl.
CPC ............ *H02M 1/42* (2013.01); *H02M 3/33546* (2013.01); *H02M 1/4258* (2013.01); *Y02B 70/126* (2013.01)

(58) Field of Classification Search
CPC ............ Y02B 70/126; Y02B 70/1491; H02M 1/4258; H02M 2001/007; H02M 3/335; H02M 1/42; H02M 3/33546
See application file for complete search history.

(56) References Cited

U.S. PATENT DOCUMENTS

| | | | | |
|---|---|---|---|---|
| 5,396,165 | A  * | 3/1995 | Hwang et al. | 323/210 |
| 5,742,151 | A  * | 4/1998 | Hwang | 323/222 |
| 6,018,469 | A  * | 1/2000 | Poon | 363/20 |
| 6,657,417 | B1 * | 12/2003 | Hwang | 323/222 |
| 6,834,002 | B2 * | 12/2004 | Yang | 363/89 |
| 7,532,489 | B2 * | 5/2009 | Lin et al. | 363/21.04 |
| 8,218,338 | B2 * | 7/2012 | Lin | 363/17 |
| 2014/0233264 | A1 * | 8/2014 | Lin | 363/17 |

* cited by examiner

*Primary Examiner* — Michael Zarroli

(57) ABSTRACT

A single stage PFC LLC power converter is consist of two transformer, one forward transformer, one main transformer. The first winding of the forward transformer is connected with a capacitor in series then paralleled with another capacitor and this circuit is connected with the primary winding of the main transformer in series as primary load circuit in LLC power converter, the energy through the main transformer is transferred to the secondary circuit and the energy through the first winding of the forward transformer is transferred to the second winding of the forward transformer to correct the input current waveform.

14 Claims, 5 Drawing Sheets

LLC SINGLE STAGE POWER FACTOR CORRECTION CONVERTER

1. TECHNICAL FIELD

The disclosure relates to a power-factor-corrected converter, and more particularly to a power-factor-corrected LLC converter in single stage.

2. PRIOR ART

Generally, the most conventional circuit for a power factor correction (PFC) employs an inductor as an energy-storage element and employs a boost control topology for correcting power factor and transferring the energy to a DC to DC converter. Therefore the material of the core of the inductor should be taken into consideration in order to avoid large hysteresis loss caused by pulse current. In order to maintain the stability of the boost control topology, additional compensation capacitors and complicated control circuit including circuit element such as an analog multiplier, are required to achieve the power factor correction. Furthermore, in the above mentioned circuit, other circuit elements having functions of frequency jitter, quasi resonant or valley switching are also included in clock control signals in order to reduce the generation of electromagnetic interference (EMI). Furthermore, because the boost control topology is employed for power factor correction, the output voltage in the circuit will be boosted to a higher voltage level such as 400V. Therefore, high voltage switching elements should be used in the DC to DC converter.

SUMMARY OF THE INVENTION

The first objective of the present invention is to provide an LLC power supply that operates from AC line voltage and has power factor correction and output isolation.

The second objective of this invention is to provide one stage power factor correction in an AC to DC (LLC) converter.

The third objective of the present invention is to provide a more efficient PFC power supply circuit.

The fourth objective of the present invention is to provide a simple PFC power supply circuit to reduce manufacture cost.

Further objectives and advantages of this invention will be apparent from the following detailed descriptions of preferred embodiments, which are illustrated, schematically, in the accompanying drawings.

BRIEF DESCRIPTION OF THE SCHEMATIC DIAGRAM

Figure 1:
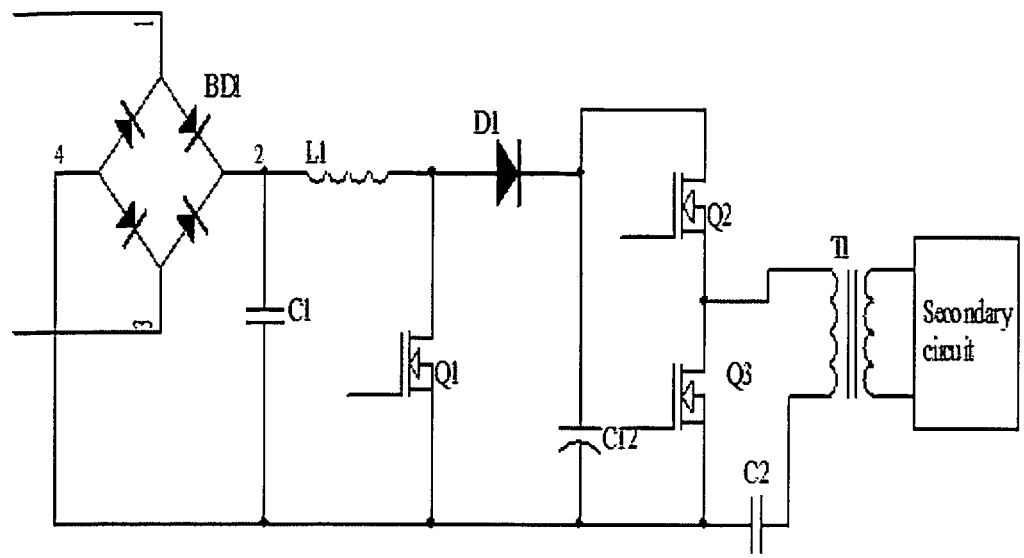
Figure 2:
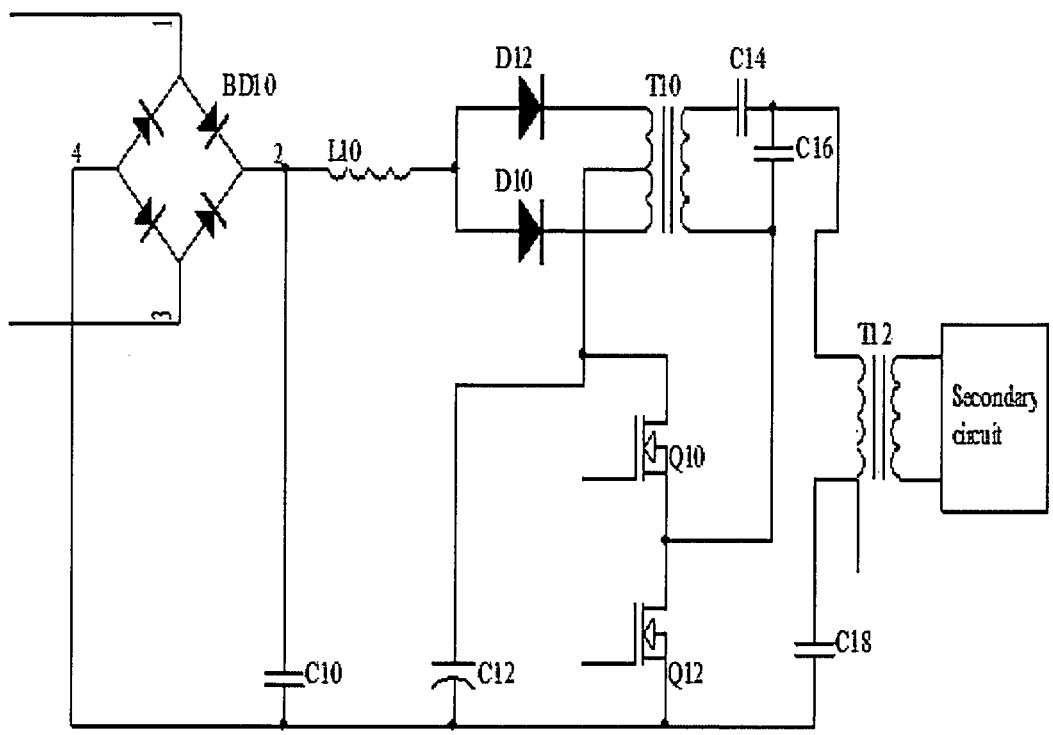
Figure 3:
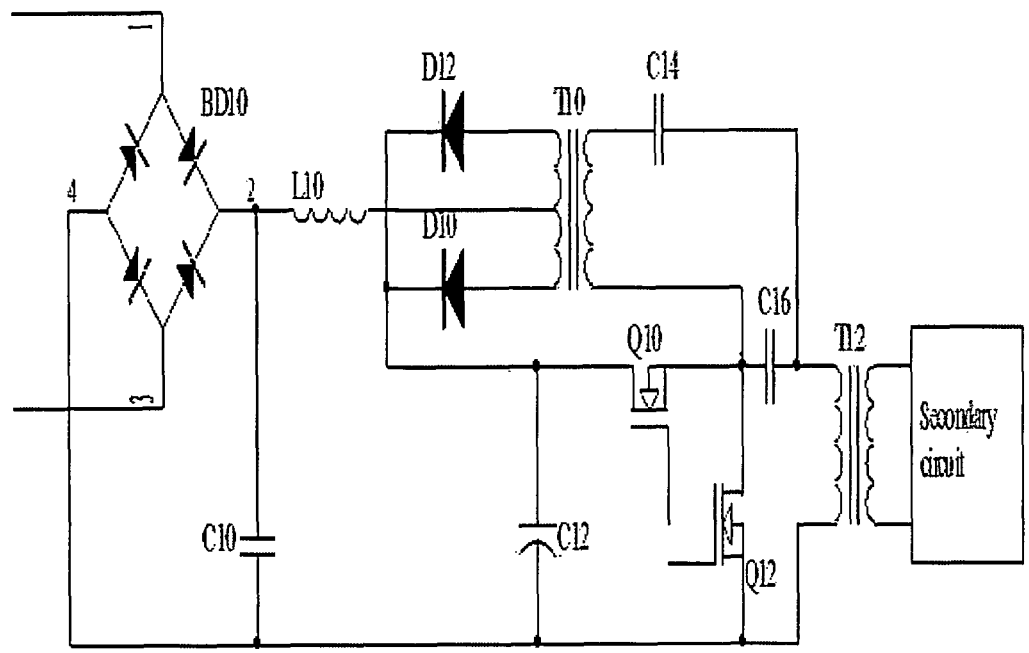
Figure 4:
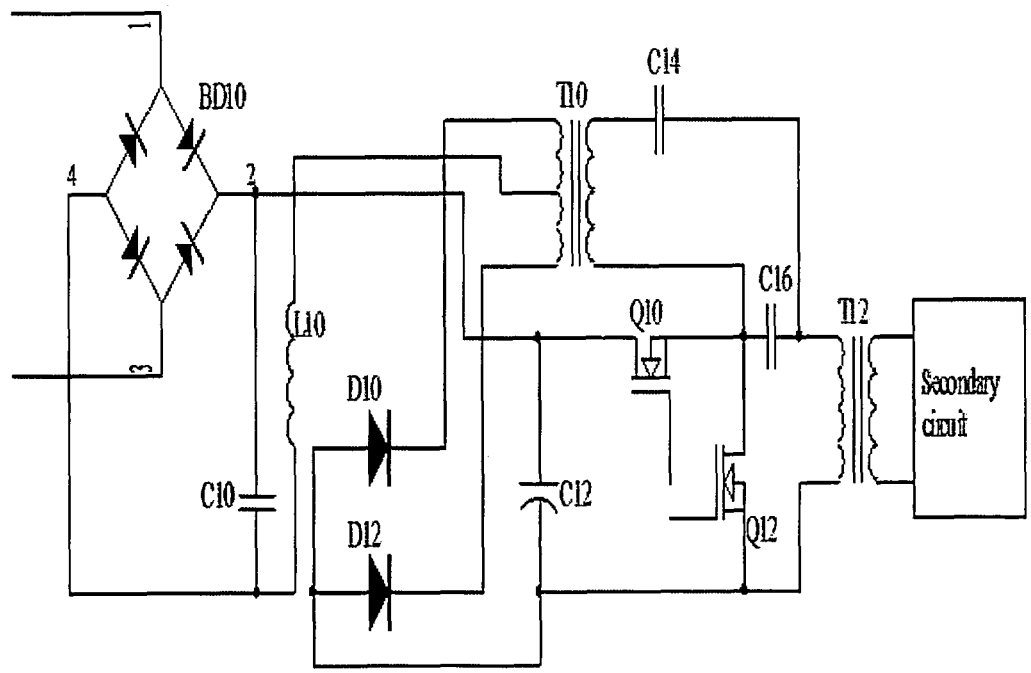
Figure 5:
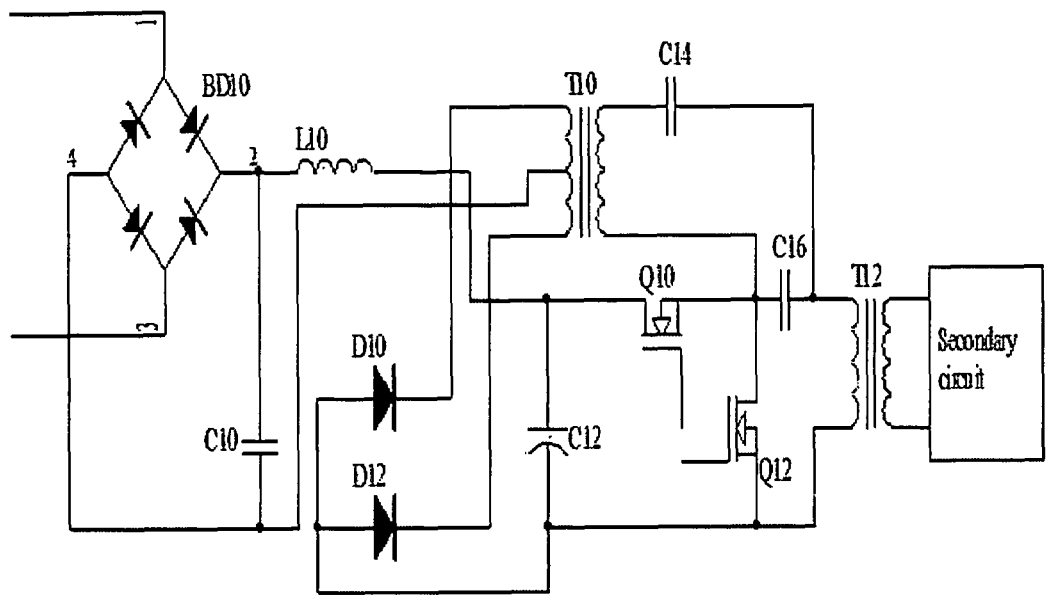
Figure 6:
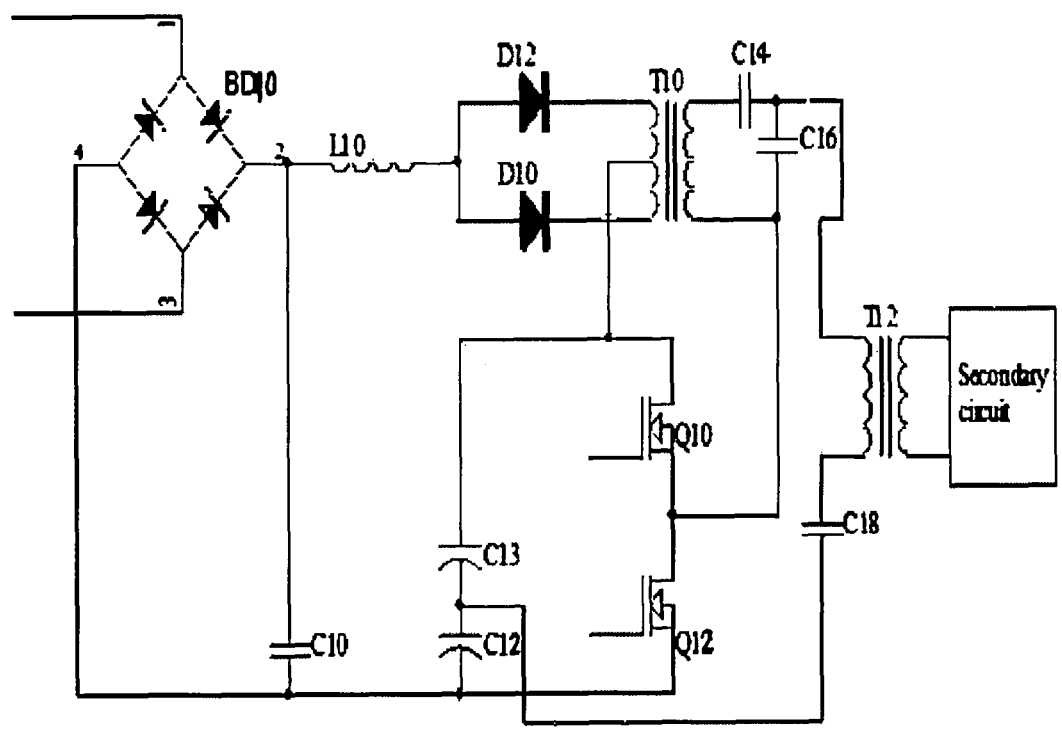
Figure 7:
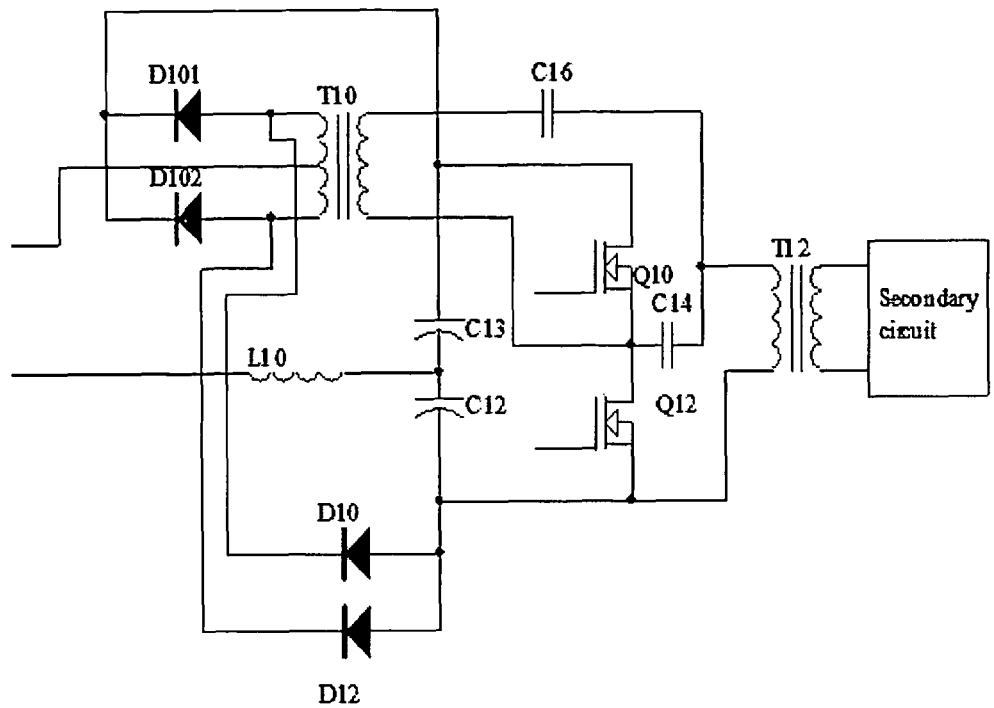
Figure 8A:
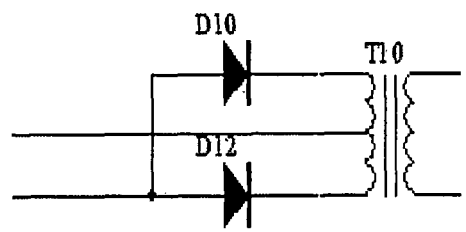
Figure 8B:
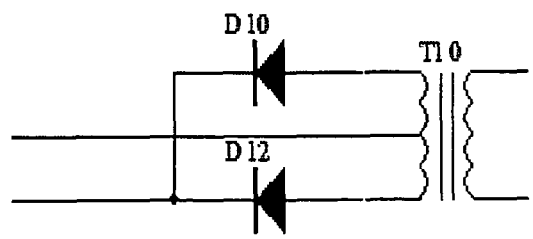
Figure 9:
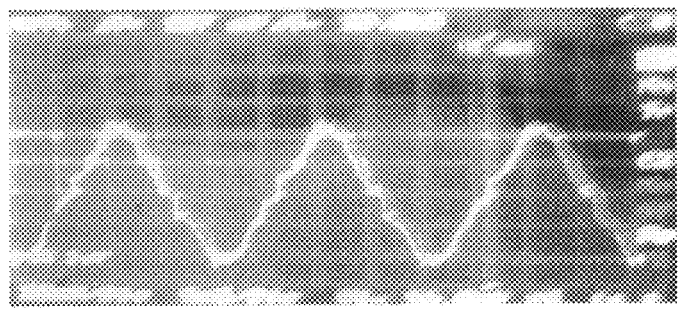

FIG. 1 is a schematic of the prior art, the two stage AC to DC converter (LLC).
FIG. 2 is a schematic diagram of the present invention.
FIG. 3 is another arrangement of the present invention
FIG. 4 is yet another arrangement of the present invention
FIG. 5 is yet another arrangement of the present invention.
FIG. 6 is yet another arrangement of the present invention.
FIG. 7 is a 120 v arrangement of the present invention.
FIG. 8 *a* and FIG. 8*b* are connecting diagrams of the forward transformer winding with two diodes.
FIG. 9 is the input current waveform of 210 w TV power supply (LLC).

DESCRIPTION OF THE PREFERRED EMBODIMENT

Before explaining the disclosed embodiments of the present invention in detail, it is to be understood that the invention is not limited in its application to the details of the particular arrangement shown since the invention is capable of other embodiments. The topology of the present invention is that a first winding of a forward transformer is connected with a capacitor in series, then the series circuit is connected with another capacitor in parallel and this circuit is connected with a primary winding of the main transformer in series as a primary load circuit in an LLC converter. The energy through the first winding of the forward transformer is used to correct the input current waveform and the energy through the primary winding of the main transformer is transferred to the secondary winding of the main transformer as output power.

Refer to FIG. 2 a single stage PFC LLC converter is comprising:
a full-bridge rectifier BD10, an inductor L10, four capacitors (C10, C12, C14 and C16), two diodes (D10 and D12), one forward transformer, one main transformer, two switches (Q10 and Q12) and a secondary circuitry.

The full-bridge rectifier BD10 has input terminals which are coupled to AC power lines and output terminals which output a rectified voltage.

The inductor has two terminals and its first terminal is coupled to the positive output terminal of the rectifier BD10.

The first diode D10 has a cathode and an anode. The anode of D10 is coupled to the second terminal of the inductor L10.

The second diode D12 has a cathode and an anode. The anode of D12 is coupled to the second terminal of the inductor L10 and the anode of D10.

The forward transformer T10 has a first winding and a second winding with a central tap. One end terminal of the second winding is connected to the cathode of diode D10 and the other end terminal of the second winding is connected to the cathode of diode D12.

The first capacitor C10 is coupled to the outputs of the full-rectifier BD10.

The second capacitor C12 has a positive terminal which is coupled to the central tap of the second winding of the forward transformer and a negative terminal which is coupled to the negative output of the full-bridge rectifier BD10.

The first switch Q10 has a first terminal which is coupled to the positive terminal of the second capacitor C12, a second terminal and a control terminal.

The second switch Q12 has a first terminal which is coupled to the second terminal of the first switch Q10, a second terminal which is coupled to the negative terminal of the second capacitor C12 and a control terminal.

The third capacitor C14 is coupled to the first winding of the forward transformer T10 in series.

The fourth capacitor C16 is connected in parallel to the series circuit which includes the third capacitor C14 and the first winding of the forward transformer T10.

The main transformer has a primary winding and a secondary winding. The primary winding of the main transformer is connected to the circuit which includes the first winding of the forward transformer T10, the third capacitor C14 and the fourth capacitor C16 as a primary load circuit of an LLC converter.

The Operation of the Diagram as Following:
When the first switch is on, a current discharges from the second capacitor C12, through the fourth capacitor C16 to the primary winding of the main transformer T12 and to the negative terminal of the second capacitor C12, another current discharges from the second capacitor C12, through the first winding of the forward transformer T10 and the third capacitor C14 to the primary winding of the main transformer T12 and to the negative terminal of the second capacitor C12. The energy through the primary winding of the main transformer is transferred to the secondary winding of the main transformer as an output power. The energy through the first winding of the forward transformer T10 is transferred to the second winding of the forward transformer T10. This energy and the input energy force a current charging the second capacitor C12 through the inductor L10, diode D12 or D10 and the second winding of the forward transformer T10 to the central tap and to the second capacitor C12.

When the first switch is off and the second switch is on, the energy in the fourth capacitor C16 is discharged through the primary winding of the main transformer T12; the energy in the third capacitor C14 is discharged through the first winding Of the forward transformer T10 and the primary winding of the main transformer T12.

The energy through the primary winding of the main transformer T12 is transferred to the secondary winding of the main transformer as an output power. The energy through the first winding of the forward transformer T10 is transferred to the second winding of the forward transformer T10. This energy and the input energy force a current charging the second capacitor C12 through inductor L10, diode D12 or D10, and the second winding of the forward transformer T10 to the central tap and to the second capacitor C12.

The arrangement, which the fourth capacitor C16 is connected in parallel with the circuit that the first winding of the forward transformer T10 is connected in series with the third capacitor C14, is used to divide current through the main transformer into two routes' current, of which one is through the fourth capacitor C16 and the other is through the first winding of the forward transformer T10 and the third capacitor C14, to prevent large current through the first winding of the forward transformer. The current ratio is dependent on the capacitance value ratio of the third capacitor C14 to the fourth capacitor C16.

There are two arrangements (FIG. 8a, Fig.b) for connecting the second winding of the forward transformer T10 to the first diode D10 and the second diode D12. One arrangement is that the two diodes' anodes are coupled together and the cathodes of the two diodes are coupled separately to the end terminals of the second winding of the forward transformer T10. The other arrangement is that the two diodes' cathodes are coupled together and the anodes of the two diodes are coupled separately to the end terminals of the second winding of the forward transformer T10. These two arrangements both have two terminals for connecting to other components. One terminal is the central tap of the second winding of the forward transformer and the other terminal is the junction of the anodes or the junction of the cathodes of the two diodes.

The inductor L10, the second capacitor C12 and the second winding of the forward transformer T10 connected with the first diode D10 and the second diode D12 are connected in series. The connecting arrangements of the inductor L10 and the second capacitor C12 and the second winding of the forward transformer T10 with two diodes are able to be changed.

When the second winding of the forward transformer T10, which is connected with the first diode D10 and the second diode D12, is placed in the position between the positive output terminal of the full-bridge rectifier BD10 and the positive terminal of the capacitor C12, the cathodes of the two diodes (D10 and D12) are coupled toward the positive terminal of the capacitor C12.

When the second winding of forward transformer T10, which is connected with the first diode D10 and the second diode D12, is placed in the position between the negative output terminal of the full-bridge rectifier BD10 and the negative terminal of the second capacitor C12, the anodes of the two diodes (D10 and D12) are coupled toward the negative terminal of the second capacitor C12. FIG. 3, FIG. 4, FIG. 5 and FIG. 6 are examples of these arrangements.

The windings' ratio of the second winding of the forward transformer T10 to the first winding of the forward transformer T10 is >4.

The capacitance value of the third capacitor C14 is larger than the capacitance value of the fourth capacitor C16.

FIG. 7 is a 120 v single stage PFC LLC power supply arrangement.

Refer to FIG. 7

The Operation Principle as Following:

When the input voltage is in the positive half cycle, the input voltage and the induced voltage in the second winding of the forward transformer T10 force a current through diode D101 or D102 and inductor L10 charging capacitor C13.

When the input voltage is in the negative half cycle, the input voltage and the induced voltage in the second winding of the forward transformer T10 force a current through diode D10 or D12 and inductor L10 charging capacitor C12.

What is claimed:

1. A single stage PFC LLC converter comprising:
a full-bridge rectifier being connected to AC power lines by its input terminals and its output terminals outputing a rectified voltage;
an inductor having a first terminal and a second terminal, its first terminal being connected to the positive output terminal of the full bridge rectifier;
a first diode having a cathode and an anode, its anode being connected to the second terminal of the inductor;
a second diode having a cathode and an anode, its anode being connected to the second terminal of the inductor and the anode of the first diode;
a forward transformer having a first winding and a second winding with a central tap, one of the two end terminals of the second winding being connected to the cathode of the first diode and the other being connected to the cathode of the second diode;
a first capacitor being coupled to the output terminals of the full-rectifier;
a second capacitor having a positive terminal, which is connected to the central tap of the second winding of the forward transformer, and a negative terminal which is connected to the negative output terminal of the full-bridge rectifier;
a first switch having a first terminal which is connected to the positive terminal of the second capacitor, a second terminal and a control terminal;
a second switch having a first terminal which is connected to the second terminal of the first switch, a second terminal which is connected to the negative terminal of the second capacitor and a control terminal;
a main transformer having a primary winding and a secondary winding;
a third capacitor being connected in series to the first winding of the forward transformer;
a fourth capacitor being connected in parallel to the series circuit which includes the third capacitor and the first winding of the forward transformer, then being connected in series to the primary winding of the main transformer as an LLC converter primary load circuit;
one terminal of the LLC converter primary load circuit being connected to the negative terminal of the second capacitor and the other terminal of the LLC converter primary load circuit being connected to the junction of the first switch and the second switch.

2. A single stage PFC LLC converter in claim 1, wherein the LLC converter primary load circuit comprises the third capacitor, the fourth capacitor, the first winding of the forward transformer and the primary winding of the main transformer.

3. A single stage PFC LLC converter in claim 2, wherein the fourth capacitor is used to provide one route for a current to conduct through to the primary winding of the main transformer and to prevent a full load current conducting through the first winding of the forward transformer; wherein the first winding of the forward transformer and the third capacitor are used to provide another route for a current to conduct through to the primary winding of the main transformer and to provide part of the load current conducting through the first winding of the forward transformer.

4. A single stage PFC LLC converter in claim 2, wherein the energy through the first winding of the forward transformer is transferred to the second winding of the forward transformer to correct the input current waveform, and wherein the energy through the primary winding of the main transformer is transferred to the secondary winding of the main transformer.

5. A single stage PFC LLC converter in claim 1, wherein, the second winding of the forward transformer is connected to the first diode and the second diode in two ways;
    wherein one way is that the anodes of the first diode and the second diode are coupled together and that the cathode of the first diode is connected to one end terminal of the second winding of the forward transformer and the cathode of the second diode is connected to the other end terminal of the second winding of the forward transformer;
    wherein the other way is that the cathodes of the first diode and the second diode are coupled together and that the anode of the first diode is connected to one end terminal of the second winding of the forward transformer and the anode of the second diode is connected to the other end terminal of the second winding of the forward transformer.

6. A single stage PFC LLC converter in claim 1, wherein the second winding of the forward transformer is used to draw a current from the input to the second capacitor.

7. A single stage PFC LLC converter in claim 1, wherein the inductor is an energy storage component, it stores energy when there is a current increasing through it, it relieves energy when the current is reducing.

8. A single stage PFC LLC converter in claim 1, wherein the inductor, the second capacitor and the second winding of the forward transformer with the first diode and the second diode are connected in series; and wherein the inductor, the second capacitor and the second winding of the forward transformer with the first diode and the second diode have several connection arrangements and all of these different connection arrangements perform input current waveform correcting function.

9. A 120 v single stage PFC LLC converter comprising:
    a forward transformer having a first winding and a second winding, its second winding having a central tap which is connected to an input power line;
    a main transformer having a primary winding and a secondary winding;
    an inductor having a first terminal and a second terminal, its first terminal being connected to the other input power line;
    a first capacitor having a positive terminal and a negative terminal, its negative terminal being connected to the second terminal of the inductor;
    a second capacitor having a positive terminal and a negative terminal, its positive terminal being connected to the second terminal of the inductor and the negative terminal of the first capacitor;
    a first diode having its anode connected to the first terminal of the second winding of the forward transformer and its cathode connected to the positive terminal of the first capacitor;
    a second diode having its anode connected to the second terminal of the second winding of the forward transformer and its cathode connected to the positive terminal of the first capacitor;
    a third diode having its cathode connected to the first terminal of the second winding of the forward transformer and its anode connected to the negative terminal of the second capacitor;
    a fourth diode having its cathode connected to the second terminal of the second winding of the forward transformer and its anode connected to the negative terminal of the second capacitor;
    a first switch having a first terminal which is connected to the positive terminal of the first capacitor, a second terminal and a control terminal;
    a second switch having a first terminal which is connected to the second terminal of the first switch, a second terminal which is connected to the negative terminal of the second capacitor and a control terminal;
    a third capacitor being connected in series to the first winding of the forward transformer;
    a fourth capacitor being connected in parallel to the series circuit which includes the third capacitor and the first winding of the forward transformer, then being connected in series to the primary winding of the main transformer as an LLC converter primary load circuit; one terminal of the LLC converter primary load circuit being connected to the negative terminal of the second capacitor and the other terminal of the LLC converter primary load circuit being connected to the junction of the first switch and the second switch.

10. A 120 v single stage PFC LLC converter in claim 9, wherein the first winding of the forward transformer is used to transfer energy to the second winding of the forward transformer to correct the input current waveform.

11. A 120 v single stage PFC LLC converter in claim 9, wherein the inductor is an energy storage component, it stores energy when there is a current increasing through it, it relieves energy when the current is reducing.

12. A 120 v single stage PFC LLC converter in claim 9, wherein there are two ways to connect the inductor to the circuit, one way is that the inductor is connected to the central tap of the second winding of the forward transformer and the other is that the inductor is connected to the junction of the first capacitor and the second capacitor.

13. A 120 v single stage PFC LLC converter in claim 9, wherein the first diode and the second diode are used to draw the input current to the first capacitor when the input voltage is in the positive half cycle, and wherein the third diode and the fourth diode are used to draw the input current to the second capacitor when the input voltage is in the negative half cycle.

14. A 120 v single stage PFC LLC converter in claim 9, wherein the second winding of the forward transformer is used to provide energy to draw a current from the input to the first capacitor and the second capacitor.

* * * * *